(12) United States Patent
Shah et al.

(10) Patent No.: US 8,134,959 B1
(45) Date of Patent: Mar. 13, 2012

(54) METHOD FOR CONTROL CHANNEL CYCLE MANAGEMENT

(75) Inventors: Maulik Shah, Overland Park, KS (US); Jasinder Pal Singh, Olathe, KS (US); Anil Harishankar Singh, Leawood, KS (US); Jason Peter Sigg, Olathe, KS (US); Ashish Bhan, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 730 days.

(21) Appl. No.: 12/252,760

(22) Filed: Oct. 16, 2008

(51) Int. Cl.
*H04W 4/00* (2009.01)
*H04B 7/00* (2006.01)

(52) U.S. Cl. ......................... 370/328; 455/515
(58) Field of Classification Search ........................ None
See application file for complete search history.

(56) References Cited

U.S. PATENT DOCUMENTS

| 6,317,436 | B1* | 11/2001 | Young et al. ................... 370/443 |
| 6,885,651 | B1* | 4/2005 | Young ........................... 370/337 |
| 7,623,503 | B2* | 11/2009 | An et al. ....................... 370/345 |
| 2007/0058628 | A1* | 3/2007 | Palnati et al. ................. 370/390 |
| 2007/0153719 | A1 | 7/2007 | Gopal |
| 2007/0238476 | A1* | 10/2007 | Sharma et al. ............... 455/515 |
| 2009/0005042 | A1* | 1/2009 | Bi ................................. 455/436 |

\* cited by examiner

*Primary Examiner* — Anh-Vu Ly

(57) ABSTRACT

A method for control cycle management in a wireless communication system. In accordance with the method, a radio access network (RAN) reserves at least one portion of a control channel cycle on an air interface forward link to carry a set of information, and determines a remaining capacity of the control channel cycle beyond the reserved portion or portions. The RAN the selects as much of the neighbor list as will fit in the remaining capacity and transmits the selected portion of the neighbor list in the control channel cycle.

19 Claims, 6 Drawing Sheets

| Control Channel Cycles | | 1 | 2 | 3 | 4 | 5 | 6 | 7 | 8 | 9 | 10 | 11 | 12 |
|---|---|---|---|---|---|---|---|---|---|---|---|---|---|
| | QC - Every Cycle | QC | QC | QC | QC | QC | QC | QC | QC | QC | QC | QC | QC |
| Control Channel Message Frequency | Sync - Once in 4 Cycles | Sync | | | | Sync | | | | Sync | | | |
| | SP - Once in 5 Cycles | SP | | | | | SP | | | | | SP | |
| | AP - Once in 4 Cycles | AP | | | | AP | | | | AP | | | |
| Total Message Size | | 952 | 192 | 192 | 192 | 440 | 704 | 192 | 192 | 440 | 192 | 704 | 192 |

FIG. 3a

| Control Channel Cycles | | 1 | 2 | 3 | 4 | 5 | 6 | 7 | 8 | 9 | 10 | 11 | 12 |
|---|---|---|---|---|---|---|---|---|---|---|---|---|---|
| | QC - Every Cycle | QC | QC | QC | QC | QC | QC | QC | QC | QC | QC | QC | QC |
| Control Channel Message Frequency | Sync - Every Cycle | Sync | Sync | Sync | Sync | Sync | Sync | Sync | Sync | Sync | Sync | Sync | Sync |
| | SP - Once in 2 Cycles | SP | | SP | | SP | | SP | | SP | | SP | |
| | AP - Once in 2 Cycles | AP | | AP | | AP | | AP | | AP | | AP | |
| | Pages Messages | P | P | P | P | P | P | P | P | P | P | P | P |

FIG. 3b

| Control Channel Cycles | | 1 | 2 | 3 | 4 | 5 | 6 | 7 | 8 | 9 | 10 | 11 | 12 |
|---|---|---|---|---|---|---|---|---|---|---|---|---|---|
| | QC - Every Cycle | QC | QC | QC | QC | QC | QC | QC | QC | QC | QC | QC | QC |
| | Sync - Every Cycle | Sync | Sync | Sync | Sync | Sync | Sync | Sync | Sync | Sync | Sync | Sync | Sync |
| | SP - Once in 2 Cycles | SP | | SP | | SP | | SP | | SP | | SP | |
| Control Channel Message Frequency | AP - Once in 2 Cycles | AP | AP | | AP | | AP | | AP | | AP | | |
| | Pages (5 pages, 80 bits/page) | P | P | P | P | P | P | P | P | P | P | P | P |
| Total Message Size | | 840 | 736 | 840 | 736 | 840 | 736 | 840 | 736 | 840 | 736 | 840 | 736 |
| Remaining Space for Neighbor List | | 152 | 256 | 152 | 256 | 152 | 256 | 152 | 256 | 152 | 256 | 152 | 256 |

FIG. 6

METHOD FOR CONTROL CHANNEL CYCLE MANAGEMENT

BACKGROUND

The use of mobile stations such as cellular telephones, personal digital assistants, pagers, or portable computers has become an increasingly popular means of communicating with others, accessing information, conducting business, and performing myriad other activities. Mobile stations typically communicate with cellular wireless networks. These mobile stations and cellular wireless networks communicate with each other over a radio frequency (RF) air interface using any of a number of communication protocols, such as evolution data optimized (EV-DO), WiMax, code division multiple access (CDMA), and other protocols.

A typical cellular wireless communication system is formed by dividing a geographic area into a set of cell sites defined by an RF radiation pattern from one or more base stations. The base stations of the cells may then be coupled to a switching system that connects the base station to a network, such as a transport network or a signaling network. Generally, when a mobile station is powered on and positioned in a cell, the mobile station may communicate with a base station within the cell via an RF air interface. Once connected to the base station through the air interface, a communication path can be established between the mobile station and the network. In this typical arrangement, one or more base stations and switching systems function as a radio access network (RAN) and enable the mobile station to communicate with a network, facilitating the transmission and receipt by the mobile station of voice calls, internet communications, and other data.

In general, the air interface used for communications from a base station to mobile stations, known as the forward link, may be divided into a plurality of channels, including traffic channels used to carry bearer traffic such as voice or other data, and control channels used to carry overhead messages. The protocol used to facilitate wireless communication between the base station and the mobile station may define a number of parameters regarding the overhead messages transmitted in the control channel, such as the type and content of the overhead messages, as well as a schedule defining how often the particular content must be transmitted. For example, the transmission of information in the control channel may be divided into control channel cycles, defined by a certain capacity based on the time allotted for transmission and the transmission rate.

In one protocol known as EV-DO, which stands for "Evolution Data Optimized" and defined by IS-856, a mobile station is typically referred to as an access terminal, and the network entity with which the access terminal communicates over the air interface is known as an access node. The access node typically includes a radio network controller (RNC), which is similar to a base station controller in other network arrangements. The access node also includes one or more base transceiver stations (BTSs), also known as "Node-Bs," each of which include at least one antenna that radiates to define respective wireless coverage areas. Among other functions, the RNC controls one or more BTSs, and acts as a conduit between the BTSs and other network entities such as a packet data serving node (PDSN). The PDSN typically provides access to a packet-data network (PDN). In combination, an access node and a PDSN can act as a RAN and facilitate communication over an air interface between an access terminal and a PDN.

Among other information, access nodes can transmit control information to access terminals over a control channel, which takes the form of certain timeslots on the forward link. An individual control channel cycle can carry a number of messages, including a quick configuration (QC) message, a sync message, an access parameters (AP) message, a system parameters (SP) message, and page messages. Typically, the SP message includes a list of neighboring coverage areas to which handoff from the current coverage area may occur. Since this neighbor list may vary in size depending on the number of neighbors a coverage area has, the SP message may also vary in size. Under the requirements of IS-856, the QC message must be sent in every control channel cycle, the AP and sync messages must be sent at least once every four cycles, and the SP must be sent at least once every five cycles. Consequently, the amount and content of the information sent in the control channel can vary from control channel cycle to control channel cycle.

OVERVIEW

Disclosed herein is a method for managing the content of the information transmitted in a control channel cycle on an air interface forward link wherein the radio area network (RAN) reserves at least one portion of a control channel cycle to carry a set of information, determines a remaining capacity of the control channel cycle beyond the reserved portion, selects as much of a neighbor list as will fit in the remaining capacity, and transmits the selected portion of the neighbor list in the control channel cycle. The reserved portion of the control channel cycle may be used to carry information specified by a communication protocol, and may include additional space reserved for page messages.

The method may also comprise determining if the selected portion of the neighbor list includes at least a predetermined fraction of the neighbor list, and responsive to a determination that the selected portion of the neighbor list does not include at least the predetermined fraction of the neighbor list, transmitting a subsequent portion of the neighbor list in a subsequent control channel cycle.

These as well as other aspects, advantages and alternatives will become apparent to those of ordinary skill in the art by reading the following detailed description with reference where appropriate to the accompanying drawings.

BRIEF DESCRIPTION OF THE DRAWINGS

FIGS. 3a-3b depicts example instances of control channel schedules used in a communication system in which exemplary methods can be implemented.

FIG. 6 is depicts a series of control channel cycles in a communication system in accordance with an exemplary implementation of the method

DETAILED DESCRIPTION OF EXEMPLARY EMBODIMENTS

While the examples described herein focus on implementations conforming to the EV-DO protocol, the methods and systems described herein may be used with any communication protocol, known now or created later, including, without limitation, code division multiple access (CDMA) (e.g., CDMA2000), integrated digital enhanced network (iDEN), time division multiple access (TDMA), advanced mobile phone system (AMPS), global system for mobile communications (GSM), general packet radio service (GPRS), universal mobile telecommunications system (UMTS), enhanced data rates for global evolution (EDGE), WiMAX (e.g., IEEE 802.16), long term evolution (LTE), microwave, millimeter wave, satellite, multichannel multipoint distribution service (MMDS), Wi-Fi (e.g., IEEE 802.11), Bluetooth, and infrared.

Figure 1:
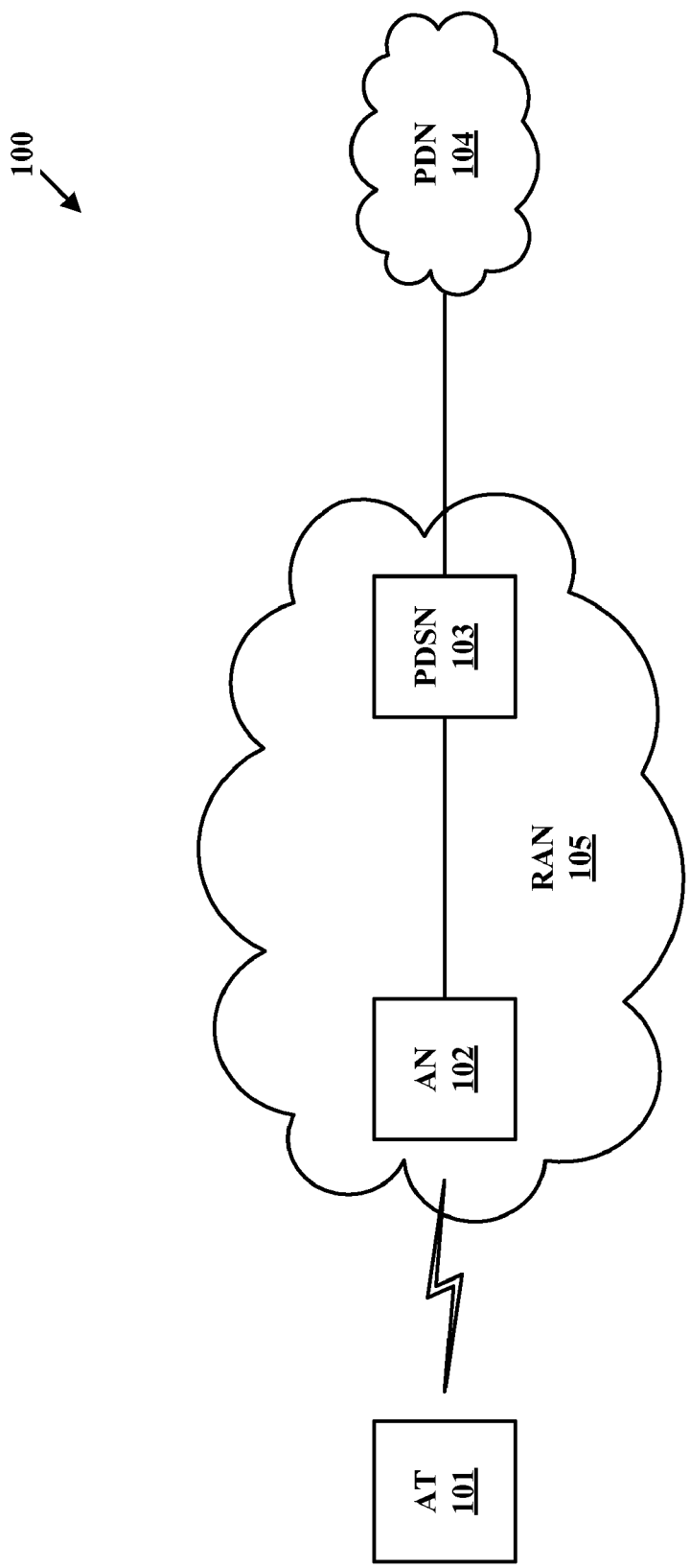
FIG. 1 is simplified block diagram of a communication system in which an exemplary method can be implemented.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal (AT) 101, an access node (AN) 102, a PDSN 103, and a packet-data network (PDN) 104. In FIG. 1, the access node 102 and PDSN 103 may be referred to collectively as a radio access network (RAN) 105. Note that additional entities not depicted in FIG. 1 could be present as well. As an example, there could be more than one access terminal in communication with access node 102; furthermore, there could be additional entities in communication with PDN 104. Also, there could be one or more devices and/or networks making up at least part of one or more of the communication links depicted in FIG. 1. As an example, there could be one or more routers, switches, or other devices or networks on the link between PDSN 103 and PDN 104.

Access terminal 101 may be any mobile device arranged to carry out the access terminal functions described herein. As such, access terminal 101 may include a user interface, a wireless communication interface, a processor, and data storage comprising instructions executable by the processor for carrying out the access terminal functions described herein. The user interface may include buttons, a touch-screen, a microphone, and/or any other elements for receiving inputs from users, as well as a speaker, one or more displays, and/or any other elements for communicating outputs to users.

The wireless communication interface may comprise an antenna and a chipset for communicating with one or more access nodes over an air interface. As an example, the chipset could be one suitable for engaging in EV-DO communications. The chipset or wireless-communication interface in general may also be able to communicate with a CDMA network, a Wi-Fi (IEEE 802.11) network, and/or one or more additional types of wireless networks. The processor and data storage may be any suitable components known to those of skill in the art. As examples, access terminal 101 could be or include a cell phone, a personal digital assistant (PDA), a computer, a laptop computer, a hybrid IS-2000/IS-856 device, and/or a multi-mode Wi-Fi/cellular device.

Access node 102 may be any one or any combination of network elements arranged to carry out the access node and/or RAN functions described herein. As such, access node 102 may include a communication interface, a processor, and data storage comprising instructions executable by the processor to carry out the access-node and/or RAN functions described herein. The communication interface may include one or more antennas and chipsets or other components for providing one or more EV-DO coverage areas such as cells or sectors, for communicating with access terminals such as access terminal 101 over an air interface. The communication interface may also include a wired packet-data interface such as an Ethernet interface for communicating directly or over one or more networks with PDSN 103. Access node 102 may include one or more base transceiver stations (BTSs) (or "Node-Bs"), as well as one or more radio network controllers (RNCs).

Figure 2:
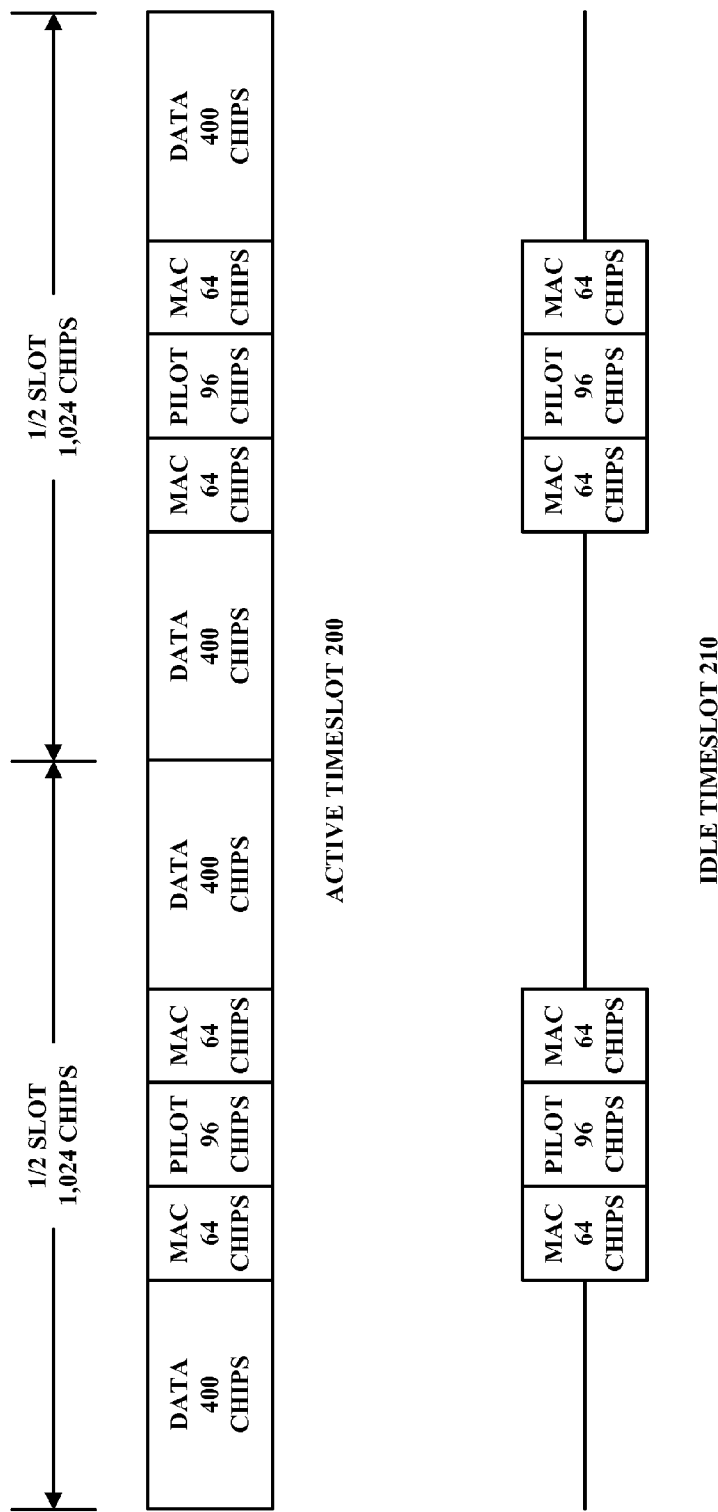
FIG. 2 is a timing diagram depicting an active timeslot and an idle timeslot, in accordance with exemplary embodiments.

Access node 102 may provide service to EV-DO access terminals on a number of carriers and in a number of wireless coverage areas, such as cells or sectors. In an EV-DO system, forward-link transmissions on each carrier in each sector are divided into timeslots and, in turn, channels. FIG. 2 illustrates two examples of timeslots, which are each 2048 chips long. As shown, each timeslot is divided into two half slots of 1024 chips each, and each half slot is then divided into a 400-chip data channel, a 64-chip Media Access Control (MAC) channel, a 96-chip pilot channel, another 64-chip MAC channel, and another 400-chip data channel.

An active timeslot, such as active timeslot 200, is one that carries user traffic or control-channel information, and thus includes the data-channel segments, whereas an idle timeslot, such as idle timeslot 210, is one that carries no user traffic or control-channel information, and thus effectively does not include any data-channel segments. Note that, when transmitting idle timeslots, access node 102 may still transmit data—such as zeroes—during the times when it would transmit the data-segments of active timeslots.

Returning to FIG. 1, PDSN 103 may be any networking server or other device arranged to carry out the PDSN and/or RAN functions described herein. As such, PDSN 103 may include a communication interface, a processor, and data storage comprising instructions executable by the processor for carrying out the PDSN and/or RAN functions described herein. The communication interface may include a wired packet-data interface such as an Ethernet interface for communicating with access node 102 and over PDN 104. Note that PDSN 103 may, instead or in addition, comprise a wireless-communication interface for communicating with access node 102 and over PDN 104. Note as well that PDSN 103 may use the same interface or separate interfaces for communicating with access node 102 and for communicating over PDN 104. As shown in FIG. 1, access node 102 and PDSN 103 function as RAN 105 to enable access terminal 101 to communicate with PDN 104.

PDN 104 may include one or more wide area networks, one or more local area networks, one or more public networks such as the Internet, one or more private networks, one or more wired networks, one or more wireless networks, and/or one or more networks of any other type. Devices in communication with PDN 104 may exchange data using a packet-switched protocol such as IP, and may be identified by an address such as an IP address.

FIGS. 3a and 3b depict two different schedules used to determine how control channel information is sent from the RAN to an access terminal in an active timeslot on the forward link of an air interface. As used herein, the term "control channel cycle" refers to a set of control channel information sent in a particular timeslot. Several types of messages may be sent from the RAN to an access terminal. In accordance with the EV-DO protocol, these types of messages include a quick configuration (QC) message, a sync message, an access parameters (AP) message, a system parameters (SP) message, and page messages. Among the information included in an SP message is a neighbor list, which identifies a group of coverage areas neighboring the coverage area that an access terminal is in.

Figure 4:
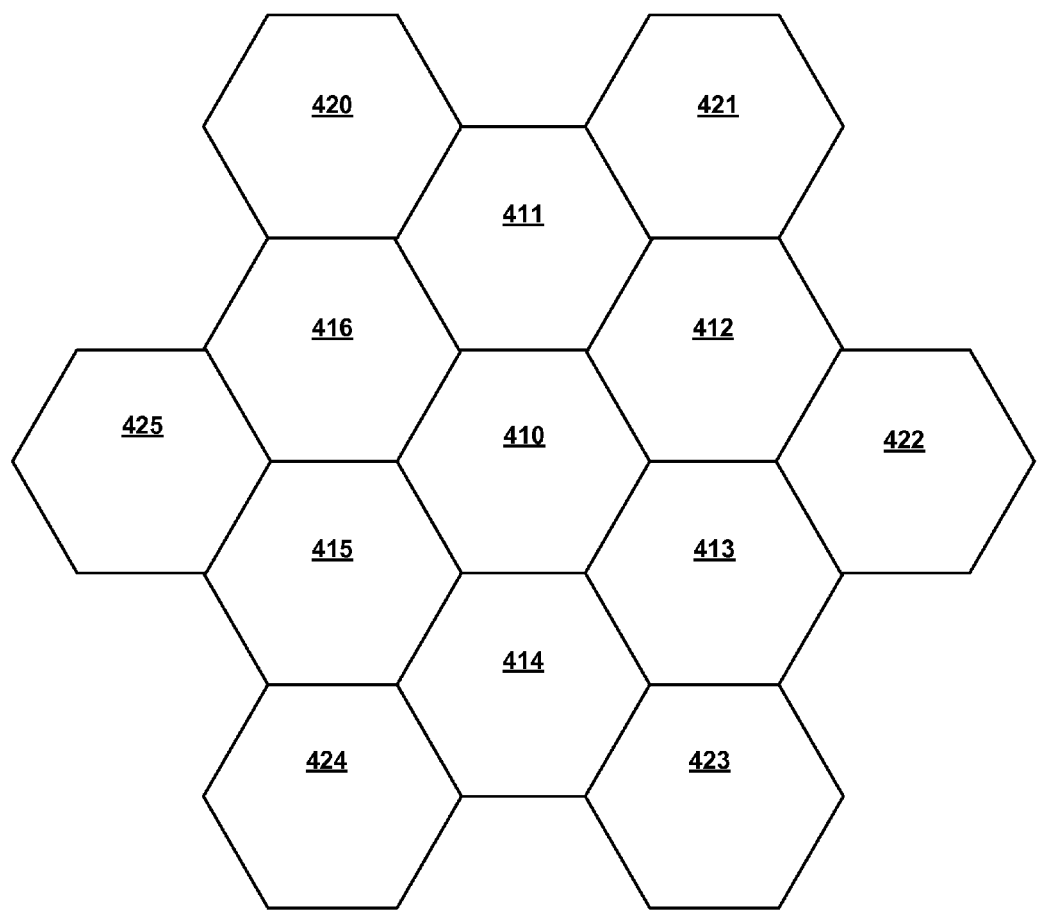
FIG. 4 depicts an arrangement of neighboring sectors that can be identified in a neighbor list that may be used with an exemplary implementation of the method.

FIG. 4 illustrates an example arrangement of neighboring wireless coverage areas that may be present in a wireless communication system, and indentified in a neighbor list. As used herein, the term "wireless coverage area" may refer to either cells or sectors within a wireless communication system. In this example, coverage areas 410-416 and 420-425 each contain a base transceiver station (BTS), or "Node B" which may be included in an access node, such as access node 102, that can communicate wirelessly with mobile stations located within the geographic area defined by wireless coverage areas 410-416 and 420-425.

Those skilled in the art will recognize that wireless coverage areas 410-416 and 420-425 are shown in an idealized manner. In practice, the geographic extent of wireless coverage areas 410-416 and 420-425 may be very different than shown in FIG. 4. For example, while distinct borders are shown between wireless coverage areas, the wireless coverage areas will be overlapping, such that there may be many locations where a mobile station can communicate with base stations in more than one wireless coverage area. As such, wireless coverage areas 410-416 and 420-425 are more representative of areas of optimal wireless communication.

As an access terminal moves from one wireless coverage area to another, a handoff process may be performed to allow an access terminal to continue wireless communication while moving between wireless coverage areas. Typically, a switch within RAN 105 is responsible for switching calls to the base stations located within wireless coverage areas 410-416 and 420-425, and also controls handoffs between base stations within wireless coverage areas.

To facilitate handoffs between base stations within wireless coverage areas, a neighbor list is associated with each wireless coverage area 410-416 and 420-425. The neighbor list identifies other wireless coverage areas that are good candidates for receiving handoffs from a given wireless coverage area. For example, the neighbor list for wireless coverage area 410 may include wireless coverage areas 411-416 and 420-425. The neighbor list may also be arranged to reflect a priority order based on proximity of the wireless coverage areas, signal strength, or other parameters. For example, the neighbor list associated with wireless coverage are 410 may designate wireless coverage areas 411-416 as first-tier neighbors based on their proximity to wireless coverage area 410, and prioritize wireless coverage areas 411-416 as good candidates for handoffs.

The neighbor lists associated with each wireless coverage area 410-416 and 420-425 are typically stored in a database within or accessible by the RAN. In an EV-DO system, neighbor lists are transmitted to access terminals, which may allow access terminals to monitor control information sent from a number of different wireless coverage areas.

Returning to FIGS. 3a and 3b, twelve control channel cycles are depicted for two systems implementing EV-DO protocols. For purposes of illustration, FIGS. 3a and 3b depict timeslots which can hold 992 bits of data in the form of control channel messages from the RAN to an access terminal. Also for the purposes of illustration, QC messages are 192 bits long, sync messages are 104 bits long, SP messages include a twenty-member neighbor list and are 512 bits long, and AP messages are 144 bits long. Those skilled in the art will appreciate that timeslots with different capacities may be used, and the control channel messages may also vary in size depending on the details of a given implementation. For example, the length of the neighbor list included in an SP message may vary depending on the number of coverage areas near a given area.

FIG. 3a depicts a schedule conforming to the minimum required message transmission frequency established by the EV-DO protocol. In FIG. 3a, QC messages are sent in every control channel cycle, sync messages and AP messages are sent once in every four cycles, and SP messages are sent once in every five cycles. As shown in FIG. 3a, a control channel cycles may have unused capacity that can be used to transmit additional messages from the RAN to an access node.

FIG. 3b depicts a schedule used in a wireless communication system that adheres to the EV-DO protocol and uses unused capacity in control channel cycles to carry additional messages. In FIG. 3b, QC messages and sync messages are sent in every control channel cycle, while SP and AP messages are sent in alternating cycles. In some wireless communication systems, sending sync, AP and SP messages more frequently than required can improve the performance of the wireless communication system. For example, sending SP messages more frequently may allow an access terminal to receive updated neighbor lists more frequently.

Page messages are also included on the schedule depicted in FIG. 3b. Page messages sent from the RAN in a control channel cycle can be used to transmit additional information to an access terminal, page access terminals, or implement a variety of other functions within the wireless communication system. The number of pages messages sent in a given control channel cycle may vary depending on need. For example, there may be many page messages to send in one control channel cycle, while there may be few or no page messages to send in subsequent control channel cycles.

Figure 5:
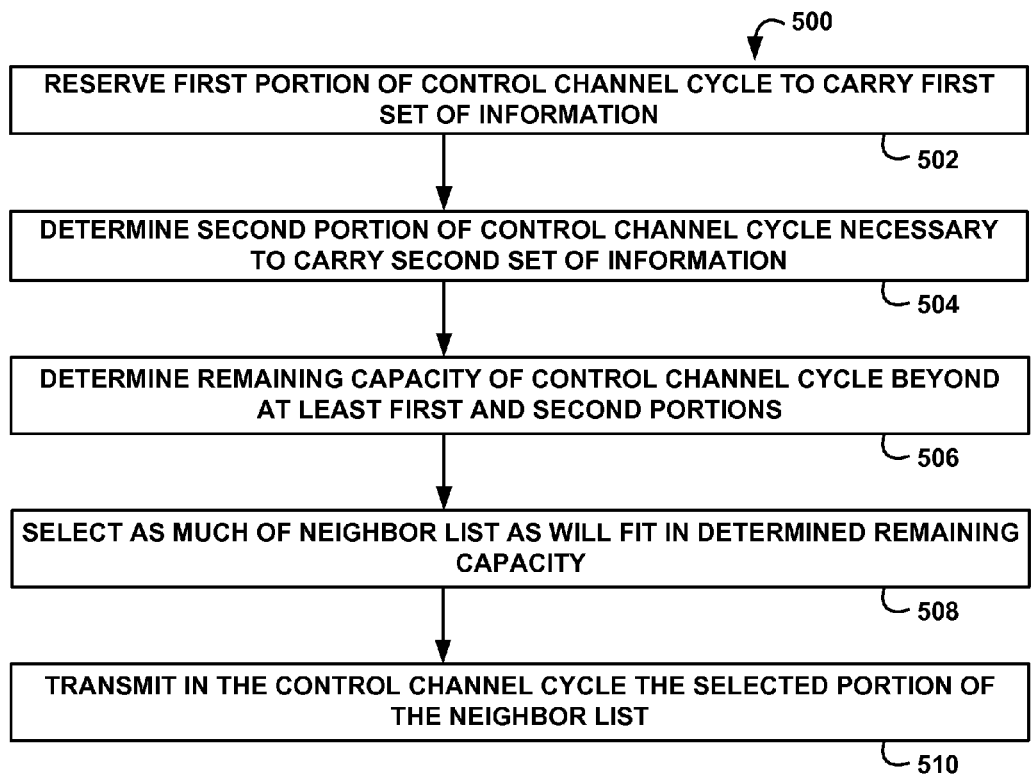
FIG. 5 is a flow chart depicting an exemplary implementation of the method.

FIG. 5 illustrates an exemplary method for managing the information sent from a RAN to an access terminal in a control channel on the forward link of an air interface. The method in FIG. 5 is discussed with reference to FIGS. 1-4. While the method is described generally in the context of an EV-DO wireless communications system, other implementations are possible using other communications protocols known now or developed later.

FIG. 5 is a flow chart that illustrates a high level method 500 for adjusting the portion of a neighbor list sent from the RAN to an access terminal in a given control channel cycle. The method 500 includes, at block 502, reserving a first portion of a control channel cycle to carry a first set of information. This first set of information may comprise any information that can be sent in a control channel cycle. For example, the first set of information may comprise a QC message, a sync message, one or more page messages, or any combination of QC, sync, or page messages. Other information in the first set of information may include information required by a communication protocol, or information used to facilitate other functionalities on a mobile station or access terminal. The reserved first portion may be set to a predetermined size. For example, if a communication protocol required a particular type of message to be sent in every control channel cycle, the size of the reserved first portion may be preset to a size sufficient to carry the required message or messages.

With reference to FIG. 3b, the reserved first portion may be preset to 296 bits in order to have sufficient capacity for a QC message and a sync message. The reserved first portion may also include a predefined portion reserved for page messages.

For example, the RAN may reserve enough capacity to hold five page messages of a fixed size.

After a first portion of the control channel cycle is reserved to carry a first set of information, the RAN determines a second portion of the control channel necessary to carry a second set of information, as shown in FIG. 5 at block 504. As with the first set of information, this second set of information may include any type of information that can be transmitted in a control channel cycle, such as information required by a communication protocol, or information directed towards other functions of a mobile station. For example, the information may include an access parameters message, a system parameters message, or both. With reference to control channel cycle 1 in FIG. 3b, if the first set of information included the QC message and the sync message, the second set of information may include the page messages scheduled to be sent in the control channel cycle and the AP message.

This second set of information may be a null set, and contain no information in a particular control channel cycle. With reference to control channel cycle 2 in FIG. 3a, if the first set of information included the QC message, there would be no additional information to include in the second portion.

The RAN may determine the second portion of the control channel cycle by monitoring the types and quantities of information identified in a predetermined schedule, such as the schedules depicted in FIGS. 3a and 3b. For example, the predetermined schedule may reflect the requirements of a communication protocol, or may be designed to ensure that particular messages are transmitted from the RAN at a particular rate.

After determining the second portion of the control channel necessary to carry a second set of information, the RAN determines the remaining capacity of the control channel cycle beyond at least the first and second portions, as shown in FIG. 5 at block 506. In this step, the RAN identifies all of the information scheduled to be sent in a given control channel cycle, exclusive of the neighbor list.

In an example implementation, the RAN may determine that a particular control channel cycle should contain a set of information comprising a QC message, a sync message, five page messages, and an access parameters message. Once the RAN has determined the amount of non-neighbor-list information scheduled to be sent in a control channel cycle, the RAN may determine if there is any remaining capacity in the control channel cycle. The RAN may determine how much, if any, capacity remains in the control channel cycle by comparing the total capacity of the control channel cycle to the size of the previously determined portions. In implementations where the control cycles are governed by a predetermined schedule, the remaining capacity may be specified in the schedule.

In implementations of the method where a single portion of the control channel cycle is reserved for non-neighbor-list information, the non-neighbor-list information may include a first subset of information comprising a fixed set of information and a second subset of information comprising a dynamically variable amount of information. The fixed subset of information may include information that is transmitted in every control channel cycle and thus the amount does not vary from control channel cycle to control channel cycle. The dynamically variable subset of information may vary from a first amount in a first control channel cycle to a second amount in a second control channel cycle based on a predetermined schedule.

For example, the fixed set of information may include a QC message, a sync message, and a fixed amount of space for page messages. The dynamically variable subset of information may follow a predetermined schedule. With reference to FIG. 3b, the dynamically variable subset of information may include an AP message in one control channel cycle, and may include the non-neighbor-list portion of the SP message in a subsequent control channel cycle.

Regardless of how the non-neighbor-list information is identified by the RAN, the RAN determines the remaining capacity of the control channel cycle by accounting for and/or reserving space for all non-neighbor-list information that may be sent in a given control channel cycle.

In block 508, the RAN selects as much of a neighbor list as will fit in the determined remaining capacity, as determined in block 506. The RAN may select any portion of the neighbor list that will fit in the determined remaining capacity. In an example implementation of the method, the neighbor list is arranged in a priority order and the selected portion of the neighbor list is selected based on the priority order of the neighbor list, such that the highest priority neighbors are included in the selected portion.

In instances where the neighbor list is long, the determined remaining capacity is small, or both, it is possible that a relatively small portion of the neighbor list is transmitted in a particular control channel cycle. In such situations, the RAN may determine if the selected portion of the neighbor list includes at least a predetermined fraction of the neighbor list. In response to a determination that the selected portion of the neighbor list does not include at least the predetermined fraction of the neighbor list, a subsequent portion of the neighbor list is identified by the RAN and transmitted in a subsequent control channel cycle. If the selected portion of neighbor list was selected based on a priority order the neighbor list, the subsequent portion of the neighbor list may be the portion of the neighbor list reflecting the highest priority neighbors that were not included in the selected portion of the neighbor list.

In an example implementation of the method, the predetermined fraction is set at one-half of the neighbor list and the transmitted portion of the neighbor list is selected based on a priority order defined by the neighbor list. If less than half of the neighbor list was transmitted in a given control channel cycle, the RAN can identify the highest priority entries on the neighbor list that were not sent in the control channel cycle and send those entries in a subsequent control channel cycle. This process can be repeated over a number of control channel cycles until the transmitted portions of the neighbor list, viewed together, represent a portion of the neighbor list greater than or equal to the predetermined fraction.

In block 510, the selected portion of the neighbor list is transmitted in the control channel cycle. No other portion of the neighbor list is transmitted in the control channel cycle.

The entire method 500 may be performed repeatedly over a number of control channel cycles. FIG. 6 depicts a schedule reflecting an exemplary implementation of method 500. In cycle 1, the QC and sync messages are included in the first set of information identified by the RAN in block 202 of FIG. 5, while the AP message and five page messages are included in the second set of information identified in block 204 of FIG. 5. In this example, the page messages are set at 80 bits per page. However, other implementations may use page messages with different or even variable lengths. As with the example control channel cycles depicted in FIGS. 3a and 3b, the each example control channel cycle in FIG. 6 can carry 992 bits of control channel messages. Consequently, for control channel cycle 1, the RAN may add a 152 bit portion of the neighbor list to control channel cycle 1.

In control channel cycle 2 of FIG. 6, the second set of information includes five page messages and the non-neighbor-list portion of the SP message. As a result, the RAN may transmit a 256 bit portion of the neighbor list in control channel cycle 2. Those skilled in the art will appreciate that the control channel capacities and message sizes described herein are non-limiting examples used to illustrate the method. The method can be used with control channel cycles of any capacity, and with messages of any size.

The method described herein is generally described as being carried out by the RAN, though it should be understood that various functions described herein can be carried out by hardware, firmware, and/or software (e.g., one or more processors programmed with machine language instructions to carry out the functions). Also, while some of the examples focus on the EV-DO protocol, those of ordinary skill in the art will readily appreciate from reading the description that the same principles could be applied with respect to other communication protocols now known or later developed.

Various arrangements and embodiments in accordance with the present invention have been described herein. It will be appreciated, however, that those skilled in the art will understand that changes and modifications may be made to these arrangements and embodiments, as well as combinations of the various embodiments without departing from the true scope and spirit of the present invention, which is defined by the following claims.

We claim:

1. In a radio access network, a method for control channel cycle management comprising:
    reserving a first portion of a control channel cycle on an air interface forward link to carry a first set of information;
    determining a second portion of the control channel cycle necessary to carry a second set of information, wherein the second portion comprises at least one message selected from the group consisting of an access parameters message and a system parameters message;
    determining a remaining capacity of the control channel cycle beyond at least the first portion and the second portion;
    selecting as much of a neighbor list as will fit in the determined remaining capacity; and
    transmitting in the control channel cycle the selected portion of the neighbor list and no other portion of the neighbor list.

2. The method of claim 1 further comprising transmitting in the control channel cycle the first set of information and the second set of information.

3. The method of claim 1 wherein the first set of information comprises at least one message selected from the group consisting of a quick configuration message, a sync message, and one or more page messages.

4. The method of claim 1 wherein the first portion includes a predefined portion reserved for page messages.

5. The method of claim 1 wherein the first portion is a predetermined size.

6. The method of claim 1 wherein the second set of information is defined by a predetermined schedule.

7. In a radio access network, a method for control channel cycle management comprising:
    reserving a first portion of a control channel cycle on an air interface forward link to carry a first set of information;
    determining a second portion of the control channel cycle necessary to carry a second set of information;
    determining a remaining capacity of the control channel cycle beyond at least the first portion and the second portion;
    selecting as much of a neighbor list as will fit in the determined remaining capacity;
    transmitting in the control channel cycle the selected portion of the neighbor list and no other portion of the neighbor list;
    determining if the selected portion of the neighbor list includes at least a predetermined fraction of the neighbor list; and
    responsive to a determination that the selected portion of the neighbor list does not include at least the predetermined fraction of the neighbor list, transmitting a subsequent portion of the neighbor list in a subsequent control channel cycle.

8. The method of claim 7 wherein selecting as much of a neighbor list as will fit in the determined remaining capacity comprises selecting a portion of the neighbor list based on a priority order defined by the neighbor list.

9. In a radio access network, a method for control channel cycle management comprising:
    on an air interface forward link, determining a first portion of a control channel cycle necessary to carry a first set of information;
    determining a remaining capacity of the control channel cycle beyond at least the first portion;
    selecting as much of a neighbor list as will fit in the determined remaining capacity;
    transmitting in the control channel cycle the selected portion of the neighbor list and no other portion of the neighbor list;
    determining if the selected portion of the neighbor list includes at least a predetermined fraction of the neighbor list; and
    responsive to a determination that the selected portion of the neighbor list does not include at least the predetermined fraction of the neighbor list, transmitting a subsequent portion of the neighbor list in a subsequent control channel cycle.

10. The method of claim 9 wherein the first portion of the control channel cycle includes a predefined portion reserved for page messages.

11. The method of claim 9 wherein the first set of information contains at least one of the group of a quick configuration message, a sync message, an access parameters message, and a system parameters message.

12. The method of claim 11 wherein the first set of information is defined by a predetermined schedule.

13. The method of claim 12 wherein the first set of information comprises:
    a first subset of information comprising a fixed amount of information; and
    a second subset of information comprising a dynamically variable amount of information, wherein the dynamically variable amount of information varies from a first amount in a first control channel cycle to second amount in a second control channel cycle based on a predetermined schedule.

14. On an air interface forward link, a method for control channel cycle management work comprising:
    reserving a first portion of a first control channel cycle on an air interface forward link to carry a first set of information;
    determining a second portion of the first control channel cycle necessary to carry a second set of information, wherein the second portion comprises at least one message selected from the group consisting of an access parameters message and a system parameters message;
    determining a remaining capacity of the first control channel cycle beyond at least the first portion and the second portion of the first control channel cycle;

selecting as much of a neighbor list as will fit in the determined remaining capacity of the first control channel cycle;

transmitting in the first control channel cycle the selected portion of the neighbor list and no other portion of the neighbor list;

reserving a first portion of a second control channel cycle on the air interface forward link to carry a third set of information;

determining a second portion of the second control channel cycle necessary to carry a fourth set of information;

determining a remaining capacity of the second control channel cycle beyond at least the first portion of the second control channel cycle and the second portion of the second control channel cycle;

selecting as much of the neighbor list as will fit in the determined remaining capacity of the second control channel cycle; and transmitting in the second control channel cycle as much of the neighbor list as will fit in the determined remaining capacity of the second control channel cycle and no other portion of the neighbor list.

15. The method of claim 14 wherein the first set of information and the third set of information each contain a predefined portion reserved for page messages.

16. The method of claim 14 wherein the amount of information in the second and fourth sets of information is defined by a predetermined schedule.

17. The method of claim 14 wherein the first portion of the first control channel cycle and the first portion of the second control channel are set to a common predetermined size.

18. The method of claim 14 further comprising determining if the selected portion of the neighbor list transmitted in the first control channel cycle includes at least a predetermined fraction of the neighbor list; and responsive to a determination that the selected portion of the neighbor list does not include at least the predetermined fraction of the neighbor list, transmitting a subsequent portion of the neighbor list in the second control channel cycle.

19. The method of claim 18 wherein the subsequent portion of the neighbor list is selected based on the portion of the neighbor list transmitted in the first control channel cycle and a priority order of the neighbor list.

* * * * *